United States Patent [19]

Xie

[11] Patent Number: 5,753,771
[45] Date of Patent: May 19, 1998

[54] NUCLEOPHILIC AMINE FUNCTIONALIZED POLYOLEFIN

[75] Inventor: Haiqi Xie, Kingston, Canada

[73] Assignee: Du Pont Canada Inc., Mississauga, Canada

[21] Appl. No.: 743,692

[22] Filed: Nov. 6, 1996

Related U.S. Application Data

[62] Division of Ser. No. 400,160, Mar. 7, 1995, Pat. No. 5,599,881.

[51] Int. Cl.$^6$ ............................................. C08F 8/32
[52] U.S. Cl. .................... 525/377.6; 525/328.5; 525/329.9; 525/382
[58] Field of Search ............... 525/327.6, 328.8, 525/329.9

[56] References Cited

U.S. PATENT DOCUMENTS

| | | | |
|---|---|---|---|
| 3,219,639 | 11/1965 | Fuchs | 260/80.5 |
| 3,417,061 | 12/1968 | Beermann | 260/79.3 |
| 3,880,811 | 4/1975 | Kaupp | 260/78 |
| 4,520,171 | 5/1985 | Diveley et al. | 525/279 |
| 4,822,688 | 4/1989 | Nogues | 428/458 |
| 4,863,624 | 9/1989 | Emert et al. | 252/51.5 |
| 5,075,383 | 12/1991 | Migdal et al. | 525/293 |
| 5,130,378 | 7/1992 | Blum et al. | 525/327.6 |
| 5,210,146 | 5/1993 | Gutierrez et al. | 525/301 |
| 5,229,022 | 7/1993 | Song et al. | 252/56 |
| 5,275,747 | 1/1994 | Gutierrez et al. | 252/51.005 |
| 5,330,837 | 7/1994 | Sullivan | 428/407 |
| 5,424,367 | 6/1995 | Auda et al. | 525/285 |

FOREIGN PATENT DOCUMENTS

| | | |
|---|---|---|
| 0 422804 | 4/1991 | European Pat. Off. . |
| 0 440 922 | 8/1991 | European Pat. Off. . |
| 1 446 341 | 6/1966 | France . |
| 36 29 167 | 4/1987 | Germany . |

*Primary Examiner*—Bernard Lipman
*Attorney, Agent, or Firm*—Monte R. Browder

[57] ABSTRACT

This invention relates to a method of producing nucleophilic amine functionalized polyolefins by reacting a polymer carrying an electrophilic functional group with a diamine having amino end-groups having different reactivities. The nucleophilic amine functionalized polyolefin has the composition:

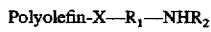

Polyolefin-X-$R_1$-$NHR_2$ where X is selected from the group of imide, amide, sulphonamide or amine $R_1$ is a bivalent organic radical $R_2$ is H or an alkyl group The nucleophilic amine functionalized polyolefin has uses as a compatibilizer, adhesive, dyeable material, and dyability improver.

2 Claims, No Drawings

NUCLEOPHILIC AMINE FUNCTIONALIZED POLYOLEFIN

This is a division of application Ser. No. 08/400,160, filed Mar. 17, 1995, now U.S. Pat. No. 5,599,881.

BACKGROUND OF INVENTION

1. Field of Invention

This invention relates to nucleophilic amine functionalized polyolefins, a method of producing nucleophilic amine functionalized polyolefins by reacting a polymer carrying an electrophilic functional group with a diamine, and the use of same as compatibilizers to make blends of polyolefins which are otherwise incompatible.

2. Background Discussion and Related Art

The blending of two or more polymers has attracted wide interest for a variety of reasons, including the development of new polymer blends and "alloys", new products, as well as the desire to recycle post-consumer plastic waste materials.

One of the technical difficulties with recycling of post-consumer plastic waste materials is the incompatibility of the different polymer materials found in plastic waste stream such as polypropylene, polyethylene, polystyrene, polyvinylchloride (PVC) and others. Generally speaking blends of incompatible or thermodynamically immiscible polymers produce blends which exhibit poor mechanical properties and processing difficulties.

Nucleophilic Amine Functionalized PolyOlefins (NAFPO's) are of interest for polymer blending and alloying, and hence the development of new polymeric materials. There are many commercial products of acid and anhydride functionalized polyolefin in the marketplace, but there are few products which are effectively capable of reacting and/or coupling with same. Although nucleophilic amine functionalized materials can react and couple with acid and anhydride functionalized materials, NAFPO's are difficult to make because of the high reactivity of nucleophilic amines. For example, Exxon Corporation is developing a Ziegler-Natta copolymerization process involving masking and demasking the amine functionality. Moreover, K. T. Chung of Penn State University utilizes a borane approach to make NAFPO's. Hydrogenation of acrylonitrile rubber can also yield nucleophilic amine containing nitrile rubber. However, these processes are relatively expensive and most of them are difficult to commercialize.

Other processes and compositions are disclosed in U.S. Pat. No. 4,822,688 which relates to an adhesive composition consisting essentially of polypropylene modified by grafting with an acid anhydride to further react with a compound bearing at least two groups capable of reacting with the anhydride.

Moreover, U.S. Pat. No. 5,130,378 relates to co-polymers prepared from olefinically unsaturated compounds having a molecular weight of 600–20,000 and containing 0.1% to 6.0% by weight of secondary amino groups.

Furthermore, Japanese Patent No. 93-274505/35 shows amino functional copolymers containing imide substituted by amino-alkyl.

It is an object of this invention to provide a new NAFPO composition and an improved method for producing NAFPO's. It is a further object of this invention to provide an improved compatibilizer to make blends of polyolefins with polar polymers.

SUMMARY OF INVENTION

The broadest aspect of this invention relates to a method of producing nucleophilic amine functionalized polyolefin by reacting: a polymer carrying an electrophilic functional group, with a diamine having amino groups of different reactivities or salts thereof. The process is preferably carried out under conditions to control cross-linking, particularly by operating in a manner to assure that the mole concentration of diamine remains greater than that of the electrophilic functional group throughout the reaction.

Another aspect of this invention relates to a nucleophilic amine functionalized polyolefin composition having the structure:

Polyolefin-X—R$_1$—NHR$_2$ where X is selected from the group of imide, amide, sulphonamide or amine R$_1$ is a bivalent organic radical R$_2$ is H or an alkyl group.

Yet another aspect of this invention relates to a multiphase thermoplastic composition consisting essentially of 0.2–99.8% by weight of Polyolefin A and 99.8%–0.2% by weight of Polyolefin B where: said Polyolefin A and Polyolefin B are immiscible polymers selected from the group of homopolymer of ethylene, homopolymer of propylene, dipolymer of ethylene and propylene, terpolymers of ethylene, propylene and diene and, copolymers of two or more monomers selected from ethylene, propylene, C$_4$–C$_{18}$ alpha-olefin, and diene monomer; with Polyolefin A carrying an electrophilic functional group where the total amount of electrophilic functional Polyolefin A to Polyolefin A is between 0.1% to 100% by weight; Polyolefin B carrying a nucleophilic amine functional group where the total amount of nucleophilic amine functionalized Polyolefin B to Polyolefin B is between 0.1% to 100% by weight.

Yet a further aspect of this invention relates to a process for improving the blending of Polyolefin A and Polyolefin B where said Polyolefin A and Polyolefin B are immiscible polymers selected from the group of homopolymers of ethylene, homopolymers of propylene, terpolymers of ethylene, propylene and diene, copolymers of two or more monomers selected from ethylene, propylene, C$_4$–C$_{18}$ alpha-olefin, and diene monomer by adding: Polyolefin A carrying an electrophilic functional group where the total amount of electrophilic functionalized Polyolefin A to Polyolefin A is between 0.1% to 100% by weight; Polyolefin B carrying a nucleophilic amine functionalized Polyolefin B where the total amount of nucleophilic amine functionalized Polyolefin B to Polyolefin B is between 0.1% to 100% by weight.

DETAILED DESCRIPTION OF INVENTION

This invention relates to a nucleophilic amine functionalized polyolefin composition and method of producing nucleophilic amine functionalized polyolefins.

The term "functional" or "functionalized" as used herein generally relates to the relatively high chemical reactivity of chemical groups or polymer materials.

The term "polyolefins" as used herein generally relates to homopolymer of ethylene, homopolymer of propylene, dipolymer of ethylene and propylene, terpolymers of ethylene, propylene and diene, and copolymers of two or more monomers selected from ethylene, propylene, C$_4$–C$_{18}$ alpha-olefin, and diene monomer.

Examples of the C$_4$–C$_{18}$ alpha-olefins include butene-1, hexene-1, and octene-1.

In particular, polyolefins of interest are polyethylene (PE), and polypropylene (PP).

The term "nucleophilic" as used herein generally relates to the capability of a base to form a covalent bond with carboxylic acid, anhydride, sulphonic acid, chlorinated hydrocarbon materials and epoxides.

More particularly, this invention relates to a method of producing nucleophilic amine functionalized polyolefins by reacting:

(a) a polymer carrying an electrophilic functional group with (b) a diamine or a salt of the diamine such as a carboxylate thereof, the diamine preferably having the structure:

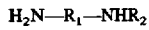

wherein $R_1$ is a bivalent organic radical (for example an alkyl group, preferably a $C_2$ to $C_{18}$ alkyl group, with or without a tertiary amino group)

$R_2$ is a H or alkyl group, preferably a $C_2$ to $C_{18}$ alkyl group.

Other diamines may be used provided that the end groups have different reactivities. Theoretically, aromatic diamines such as phenylene diamines should work but are not preferred since they are toxic, easily oxidized and cause strong discoloration of products.

Examples of possibly useful diamines are as set forth in Table I.

as a co-rotating intermeshing BERSTORFF® twin-screw extruder under conditions that control cross-linking. This can be done by assuring that the mole concentration of the diamine is kept at a mole amount at least equal to the mole amount of the electorphilic group of the reactive resin throughout the process, preferably about 1.2 times (more preferably at least 2 times) the mole amount of the electrophilic group of the reactive resin. To assure that this condition exists throughout the reaction, special startup and shutdown procedures are preferred. On startup, for example, the extruder preferably is initially flushed with a non-reactive resin, for example high density polyethylene (HDPE) resin such as SCLAIR®2907 resin With the non-reactive resin still being fed to the extruder, the diamine, for example 1,3-pentanediamine (DuPont trade-mark Dytek®EP), feed is then started. When the diamine feed is established, the resin feed is switched from the non-reactive resin to the reactive resin, for example EPDM resin grafted with 0.65 wt % maleic anhydride (MAH).

Preferably, sufficient inert gas such as nitrogen is co-currently injected into a middle barrel section of the extruder, dispersing and compressing the gas into the polymer melt, then allowing the gas to expand and generate a large amount of surface so that any residual diamine can be efficiently removed from the resulting NAFPO. Inert gas

TABLE I

Primary-Primary Diamines 1,3-Pentanediamine (Dytek ® EP)

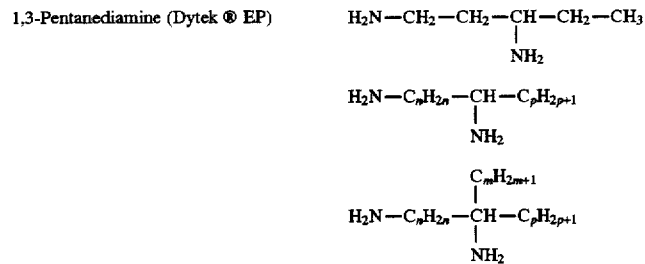

Primary-Secondary Diamines

N-(2-Aminoethyl)piperazine (AEP)

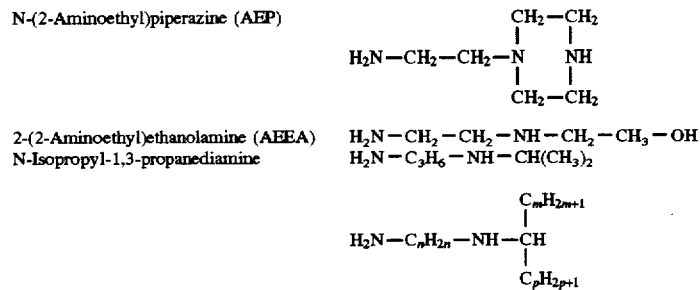

2-(2-Aminoethyl)ethanolamine (AEEA)    $H_2N-CH_2-CH_2-NH-CH_2-CH_3-OH$
N-Isopropyl-1,3-propanediamine    $H_2N-C_3H_6-NH-CH(CH_3)_2$

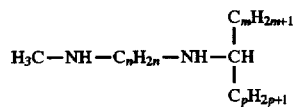

Secondary-Secondary Diamine $H_3C-NH-C_nH_{2n}-NH-\underset{\underset{C_pH_{2p+1}}{|}}{\overset{\overset{C_mH_{2m+1}}{|}}{CH}}$ $C_nH_{2n}$ can be linear or branched such as $-(CH_2)_n-$ or $-CH_2-CH(CH_3)-$, or $-CH_2-C(CH_3)_2-$ and n, m, and p are integrals equal to or larger than 1, preferably up to 18.

The process for making the NAFPO's preferably is carried out in a continuous process employing an extruder such flow should be at a rate equal to at least 0.1 weight percent based on the reactive resin, preferably at least 2 weight Polyolefin-imide linkage-R-Amine where R is a divalent organic radical, and Amine is any nucleophilic secondary or primary amine

Copolymers of Olefin and Vinyl Monomer

Moreover, a further embodiment of this invention relates to the production of nucleophilic amine functionalized polyolefin by reacting a polymer carrying an electrophilic functional group with the diamine as referred to above, where the electrophilic functionalized polyolefin is produced by the copolymerization of one or more vinyl monomers with an electrophilic functional group and one or more of the following monomers, ethylene, propylene, $C_4$–$C_{18}$ alpha-olefin, or diene monomer.

Polymers with Carboxylic Acid, Chlorinated Polyolefins, Epoxy, Sulphonic Acid, and Anhydride Another embodiment of the invention relates to the method of producing nucleophilic amine functionalized polyolefins by utilizing a polymer carrying an electrophilic functional group where the electrophilic functional group is selected from the group carboxylic acid (COOH), chlorocarbon (C—Cl), epoxy, sulphonic acid (—$SO_3H$), and anhydride. The following illustrates a typical reaction, namely:

where Y is an electrophilic functional group such as COOH, C—Cl, epoxy, —$SO_3H$, anhydride;

X, $R_1$ and $R_2$ are defined above.

Composition

This invention also relates to a nucleophilic amine functionalized polyolefin composition having the structure:

Polyolefin-X—$R_1$—$NHR_2$ where X is selected from the group of imide, amide, sulphonamide or amine $R_1$ is a bivalent organic radical $R_2$ is H or an alkyl group The symbol X will have the structure referred to below, when producing the nucleophilic amine functionalized polyolefins in accordance with the process referred to above when utilizing the electrophilic functional group as follows:

| x | Electrophilic Functional Group |
|---|---|
| imide | anhydride |
| amide | carboxylic acid |
| amine | epoxy |
| sulphonamide | sulphonic acid |
| amine | chlorinated polyolefins |

In other words by melt processing the maleic anhydride modified polyolefins identified by DuPont Canada's trademark FUSABOND® with the diamines, the following nucleophilic amine functionalized polyolefin composition is produced, namely:

Polyolefin-imide-$R_1$—$NHR_2$ where $R_1$ is a bivalent organic radical $R_2$ is H or an alkyl group

Compatibilizers

NAFPO's can be used as compatibilizers to make blends or alloys of polyolefins which are otherwise incompatible.

For example, the compatibility of generally immiscible polyolefin A ($PO_A$) and polyolefin B ($PO_B$) may be improved by utilizing a NAFPO.

The following is illustrative of such reaction, namely:

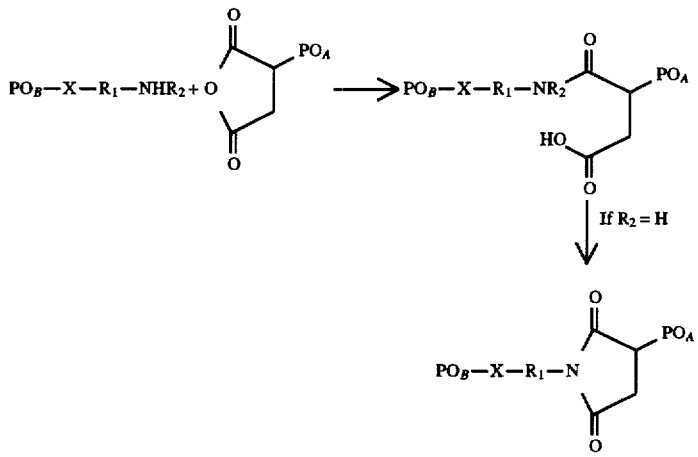

EXAMPLES

Such reaction may be further particularized by the following example which shall serve as being illustrative of one example utilizing NAFPO's as compatibilizers:

Example of Compatibilizer

Generally speaking, polypropylene and polyethylene are immiscible polyolefins. In this example, we select polyolefin $PO_A$ as polyethylene, and polyolefin $PO_B$ as polypropylene.

In this example a blend of approximately 30% by weight of polypropylene to 70% by weight of polyethylene is produced. Such blend may be produced by utilizing 63.6% by weight of polyethylene and 3.9% of polyethylene which has been grafted with maleic anhydride, namely PE-g-MAH. 27.3% by weight of polypropylene may also be utilized along with 5.2% by weight of nucleophilic amine functionalized polypropylene (NAFPO P) made in accordance with the invention herein.

Although this example shows the use of 3.9% by weight of PE-g-MAH, and 5.2% by weight of NAFPO P, the compatibilization of the polypropylene and polyethylene may be accomplished by utilizing a minimum of 0.1% to a percent, more preferably up to 5 weight percent. Higher inert gas flow rates are preferred for higher levels of diamine feed. Alternately to co-current up-stream enhanced devolatilization, down-stream counter-current devolatilization techniques can be used.

Flow of diamine, reactive resin and inert gas are maintained until desired product is made. Then the inert gas flow is discontinued and the reactive resin feed is switched to the non-reactive resin (HDPE, for example). The diamine injection is continued for sufficient time, say 5 more minutes, to assure that all reactive resin has been flushed from extruder before diamine feed is stopped. Flushing of the extruder with the non-reactive resin is continued after the diamine feed is stopped until no diamine is detected in the polymer exiting the extruder.

Electrophilic Functional Groups

The term "electrophilic functional groups" as used herein relates to chemical groups which can withdraw electrons from other chemical groups. The polymer carrying an electrophilic functional group in accordance with this invention may be the following:

(i) Polyolefin grafted with Grafting Monomer;
(ii) Copolymers of olefin and vinyl monomers.

Polyolefin Grafted with Grafting Monomer

The "grafted polyolefin" may be formed from at least one of a homopolymer of ethylene, a homopolymer of propylene, copolymers of ethylene and propylene especially copolymers of propylene with minor amounts of ethylene as in impact and random copolymer polypropylene, terpolymers of ethylene, propylene and dienes, e.g. EPDM marketed by DuPont under the tradename NORDEL®, or a copolymer of ethylene with at least one of a $C_3$–$C_{18}$ alpha-olefins. Examples of the alpha-olefins include butene-1, hexene-1 and octene-1. The copolymers may include both linear low density polyethylene and very low density polyethylene.

The grafting monomer is at least one monomer selected from ethylenically unsaturated carboxylic acids and ethylenically unsaturated carboxylic acid anhydrides, including, less preferably, derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride, and substituted maleic anhydride, e.g. dimethyl maleic anhydride or citraconic anhydride, nadic anhydride, nadic methyl anhydride, and tetrahydrophthalic anhydride, maleic anhydride being particularly preferred. Examples of the derivatives of the unsaturated acids are salts, amides, imides and esters, e.g. mono- and disodium maleate, acrylamide, maleimide, glycidyl methacrylate and dimethyl fumarate. Techniques for the grafting of such monomers onto the polyolefin are known, e.g. as described in U.S. Pat. No. 4,612,155 of R. A. Zelonka and C. S. Wong, which issued Sep. 16, 1986, and in published European Patent Application Number 0,398,604 of D. J. Mitchell, published May 23, 1990. The present invention will be particularly described herein with reference to maleic anhydride as the grafting monomer.

In particular the example herein shall be described with reference to maleic anhydride grafted polyolefin (PO-g-MAH) sold by DuPont Canada under the trademark FUSA-BOND® which includes maleic anhydride grafted polypropylene (PP-g-MAH).

Accordingly, the nucleophilic amine functionalized polyolefins (NAFPO's) in accordance with one embodiment of this invention are made by melt processing of maleic anhydride modified or grafted polyolefins with the diamines as referred to above. In particular, the two amino groups of the diamines have different reactivity towards the anhydride on the polyolefins. In other words, the NAFPO's are produced by diamine derivatization of anhydride functionalized polyolefins, and in one specific example by derivatization of FUSABOND® (trade-mark of DuPont Canada) with diamines. During melt processing, one amino group of the diamines is reacted with the anhydride and the other remains as the new functionality, namely a reactive nucleophilic amino group. For example, the following is illustrative of a typical reaction:

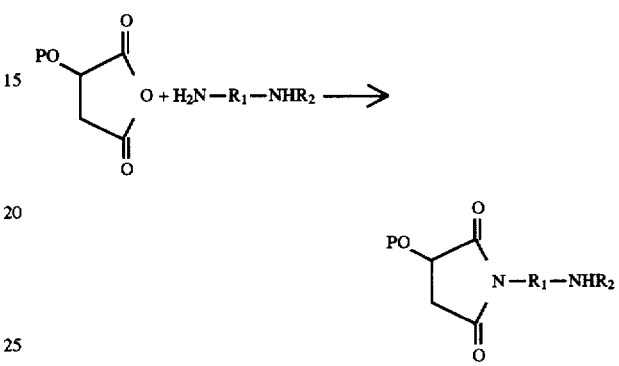

where PO is a polyolefin
$R_1$ is a bivalent organic radical
$R_2$ may be H or alkyl group.

More specific examples of the foregoing illustrating diamines that can be used in accordance with this invention include:

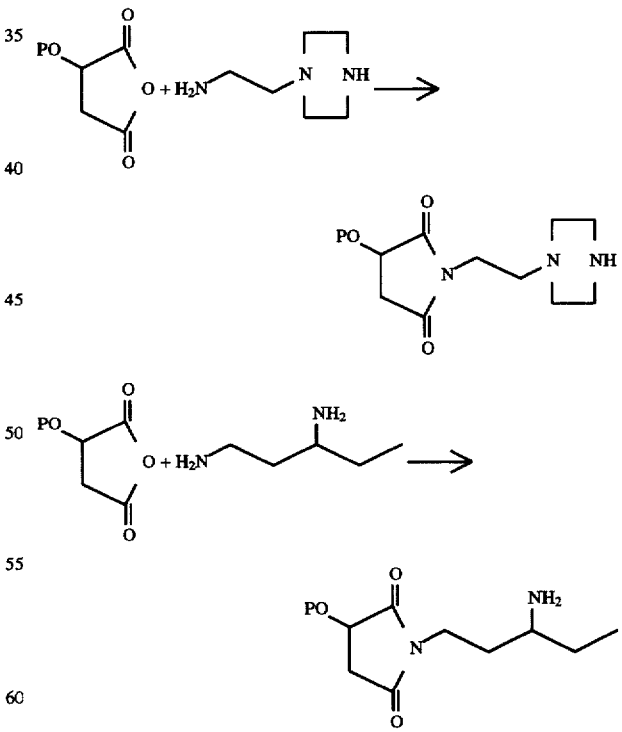

The nucleophilic amine functionalized polyolefins made by melt processing of maleic anhydride with the modified polyolefins known by DuPont Canada's trade-mark FUSA-BOND® with the diamines as referred to above have the following general chemical structure:

maximum of 100% by weight of PE-g-MAH to polyethylene along with a minimum of 0.1% to a maximum of 100% NAFPO P to polypropylene. The ratio of PE-g-MAH to polyethylene and ratio of NAFPO P to polypropylene can be selected based on the economics of the process. In other words, higher concentrations of PE-g-MAH and NAFPO P may be more costly.

In addition, the combination of PP-g-MAH and nucleophilic amine functionalized polyethylene (NAFPO E) can also bring about improved mechanical properties for PP/PE blends.

Moreover, in the example referred to herein the relative ratio of polypropylene to polyethylene is approximately 30% to 70% by weight although the blend ratio can vary between 0.2%–99.8% by weight of polypropylene to polyethylene.

Another example of utilizing NAFPO's as compatibilizers relates to blending polypropylene to ethylene propylene and diene modified polymers, namely EPDM. In this example, a blend of approximately 70% by weight of polypropylene is blended with approximately 30% by weight of EPDM whereby 65% by weight of polypropylene is blended with 5% by weight of nucleophilic amine functionalized polypropylene made in accordance with the invention herein NAFPO P, with 5% by weight of EPDM-g-MAH and 25% by weight of EPDM.

Examples 1–3

The following examples for making the NAFPO were carried out in a 25 mm co-rotating intermeshing BERSTORFF® twin-screw extruder operating at screw speed of 250 revolutions per minute under conditions that control cross-linking. The mole concentration of the diamine was kept higher than that of the anhydride throughout the process. The extruder was initially flushed with a non-reactive resin, for example high density polyethylene (HDPE) resin such as SCLAIR® 2907 resin. With the HDPE still being fed to the extruder, the diamine, for example 1,3-pentanediamine (DuPont trade-mark Dytek®EP), feed was then started. When the diamine feed was established, the resin feed was switched from the HDPE to the reactive resin, for example EPDM resin grafted with 0.65 wt % MAH. Sufficient nitrogen was co-currently injected into a middle barrel section of the extruder, dispersed and compressed in the polymer melt, then allowed to expand and generate a large amount of surface so that any residual diamine can be efficiently removed from the resulting NAFPO.

Flow of diamine, reactive resin and inert gas were maintained at appropriate levels until desired product was made. Then the nitrogen flow was discontinued and the reactive resin feed was switched to the non-reactive resin (HDPE, for example). The diamine injection was continued, for say 5 more minutes, to assure that all reactive resin was flushed from extruder before diamine feed was stopped. Flushing of the extruder with the non-reactive resin was continued after the diamine feed was stopped until no diamine was detected in the polymer exiting the extruder.

Example 1

Making EPDM based NAFPO 11.9 pounds/hour EPDM resin containing 0.65 wt % MAH was reacted with 0.20 pounds/hour 1,3-pentanediamine (DuPont trade-mark Dytek ®EP) in a twin-screw extruder at 170° C. Nitrogen flow was about 1.6–1.7 standard liters per minute (SLPM), measured under standard conditions of 25° C. and 1 atmosphere. The starting EPDM resin has a Melt Flow Index (MFI) of 10 g/10 min (ASTM D1238, conditions E). The finished product has MFI of 4.5 g/10 min under the same conditions. Infrared spectrum shows complete conversion of anhydride group to imide functionality.

Example 2

Making PP based NAFPO 21.3 pounds/hour polypropylene resin containing 0.66 wt % MAH was reacted with 0.28 pounds/hour N-(2-aminoethyl) piperazine (AEP) in a twin-screw extruder at 200° C. Nitrogen flow was 1.6–1.7 SLPM. The starting PP resin has a Melt Flow Index (MFI) of 105 g/10 min (ASTM D1238, conditions E). The finished product has MFI of 33.5 g/10 min under the same conditions. Infrared spectrum shows complete conversion of anhydride group to imide functionality.

Example 3

Making PE based NAFPO 13.5 pounds/hour polyethylene resin containing 0.8 wt % MAH was reacted with 0.26 pounds/hour N-(2-aminoethyl) piperazine (AEP) in a twin-screw extruder at 250° C. Nitrogen flow was 1.6–1.7 SLPM. The starting PP resin has a Melt Flow Index (MFI) of 1.5 g/10 min (ASTM D1238, conditions E). The finished product has MFI of 0.2 g/10 min under the same conditions. Infrared spectrum shows complete conversion of anhydride group to imide functionality.

End Use Examples

Alloying PE/PP blend

A PE/PP 70/30 by weight blend was prepared on a twin-screw extruder by mixing 63.6 parts PE, 27.3 parts PP, 3.9 parts PE containing 1 wt % MAH graft, and 5.2 parts PP based NAFPO prepared in Example 2. This PE/PP alloy has Notched Izod impact strength of 0.81 ft. lb./in compared with 0.36 ft. lb./in for a PE/PP 70/30 by weight blend without NAFPO.

NAFPO in Nylon Blends

The nucleophilic amino functionality of NAFPO can react with carboxylic acid group in Nylon. This allows the use of NAFPO in the preparation of Nylon blends. Such compatibilized Nylon/Polyolefin blends have superior mechanic properties than the non-compatibilized blends. For example, Nylon/EPDM blends with less than 20 wt % NAFPO have much higher impact resistance and stiffness than the same blends without NAFPO. Traditionally, Nylon/Polyolefin blends have been compatibilized using the amino group from Nylon and the anhydride or carboxylic acid group from polyolefins. However, the recycled Nylon stream such as in Nylon carpet yarn contains no amino group but predominantly consists of carboxylic acid group. The carboxylic acid group can be also introduced to Nylon during the Nylon synthesis by end group controlling technology largely available in commercial Nylon production processes. Therefore NAFPO can be used for compounding of both virgin and recycled Nylon products.

NAFPO can be used for blending nylon with polyolefins such as PE, PP, ethylene-propylene rubber, or EPDM.

Adhesives

The NAFPO's produced in accordance with this invention may also be utilized as effective adhesives with various substrates such as nylon, PVC, and MYLAR® film.

Other Uses

Moreover, the NAFPO's described herein may be utilized as dye sites for acidic dyes, as well as immobilized nucleophiles to extract hazardous acids and immobilized acid traps or scavengers. Examples of acid trap reactions and immobilized nucleophiles include:

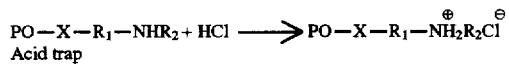
Acid trap

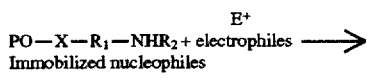
Immobilized nucleophiles $$PO-X-R_1\text{-electrophiles}$$

Carboxylic Acid, Chlorination Polyolefins, Epoxy, Sulphonic acid, Anhydride

Further examples of applications of NAFPO's to compatibilize $PO_B$ and $PO_A$ by utilizing polymers carrying an electrophilic functional group selected from the group of carboxylic acid, chlorinated polyolefins, epoxys, sulphonic acids, and anhydrides includes the following:

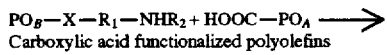
Carboxylic acid functionalized polyolefins

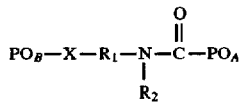

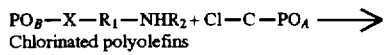
Chlorinated polyolefins

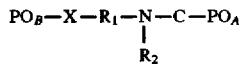

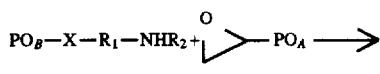
Epoxy functionalized polyolefins

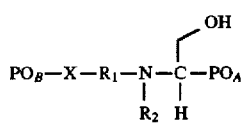

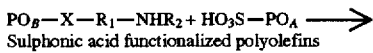
Sulphonic acid functionalized polyolefins

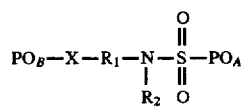

Although the preferred embodiment as well as the operation and the use have been specifically described in relation to the drawings, it should be understood the variations in the preferred embodiment could be achieved by a man skilled in the art without departing from the spirit of the invention.

The embodiments of the invention in which an exclusive property or privilege is claimed are defined as follows:

1. A nucleophilic amine functionalized polyolefin composition having the structure:

$$\text{Polyolefin-X}-R_1-NHR_2$$

where X is selected from the group of imide, amide, sulphonamide or amine, $R_1$ is a bivalent organic radical, and $R_2$ is H or an alkyl group.

2. The composition as claimed in claim 1 wherein X is an imide.

* * * * *